INVENTOR.

BY SCOTT C. RETHORST

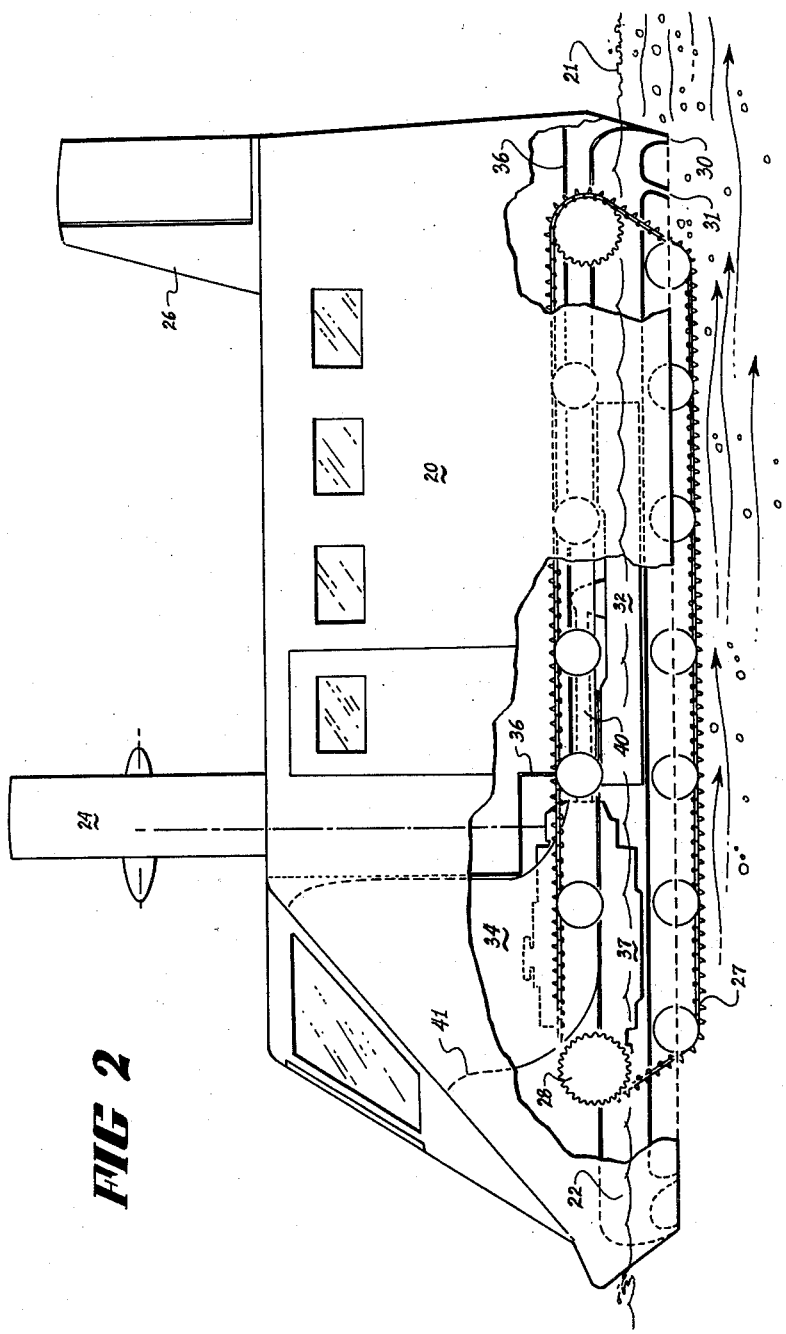

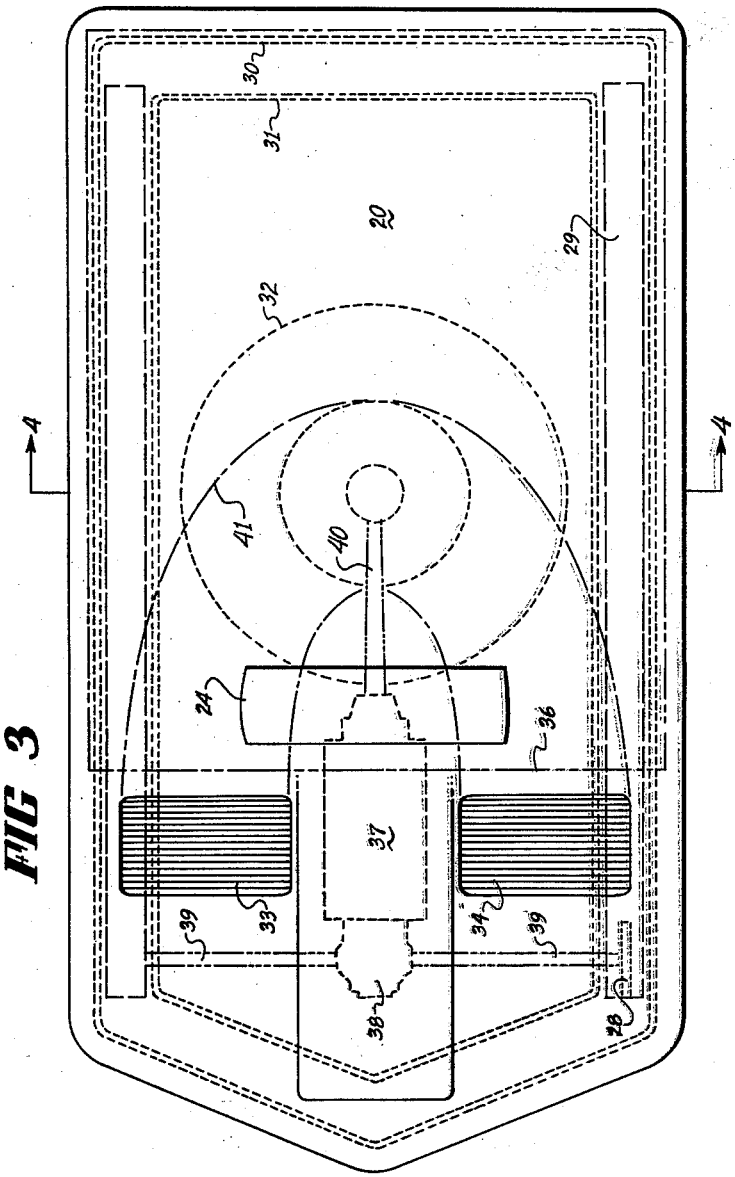

United States Patent Office 3,189,115
Patented June 15, 1965

3,189,115
AQUA-TRACK G.E.M.
Scott C. Rethorst, 1661 Lombardy Road, Pasadena, Calif.
Filed May 27, 1963, Ser. No. 283,275
9 Claims. (Cl. 180—7)

This invention relates to a ground effect machine (hereinafter referred to as a G.E.M.). In particular, it relates to an amphibious tracked vehicle with G.E.M. and displacement vessel capabilities.

The general object of the invention is to provide in one vehicle means of transporting personnel and equipment between a vessel lying offshore and points inland, whether such inland points are accessible by road or separated from the landing point by friable or yielding surfaces.

During the Second World War, troops were landed on hostile shores in many different campaigns. The approach of their landing craft to the shore was seldom faster than seven knots, and in addition to the hazards of enemy fire there was the danger of being upset in the surf. A vessel large enough to negotiate heavy surf in safety was unable to land its cargo directly on the beach and troops were required to wade ashore, probably chest-deep in water and still under fire. Unless suitable vehicles were available, there followed the journey over the beach and unprepared terrain to the inland destination. Likewise, commercial shipping is still limited by its requirement for docking facilities and the need for unloading cargo for overland transportation.

The vehicle described herein combines the versatilities of a displacement vessel, a ground effect machine, and a cross-country tracked vehicle. As such it is, capable of carrying a payload from an ocean-going vessel at high speed through or above the shallow water near the shore—its mode of operation, G.E.M. or displacement vessel, being governed by the sea state—and then negotiating land surfaces as a G.E.M. or as a tracked vehicle, once again its mode depending on the nature of the surface to be traversed.

While the principles of the invention are applicable to a vehicle of any size, for the purposes of this specification and the accompanying drawings, the vehicle considered is one capable of carrying five tons of cargo or a comparable number of men and equipment. It is to be understood, however, that the descriptions and drawings do not limit the scope of the invention from that expressed by the claims hereunto appended.

Of the accompanying drawings, wherein like numerals designate like or corresponding parts in the several views:

FIGURE 1 is a perspective view of the aqua-track G.E.M. in its displacement vessel role, FIGURE 2 is a side view of the aqua-track G.E.M. still in its displacement vessel role, FIGURE 3 is a plan view of the aqua-track G.E.M., FIGURE 4 is a cross section view of FIGURE 3, showing the aqua-track G.E.M. operating over water as a G.E.M., and over land as a tracked vehicle, FIGURE 5 is a cross section view of the track suspension arrangement.

Figure 1:
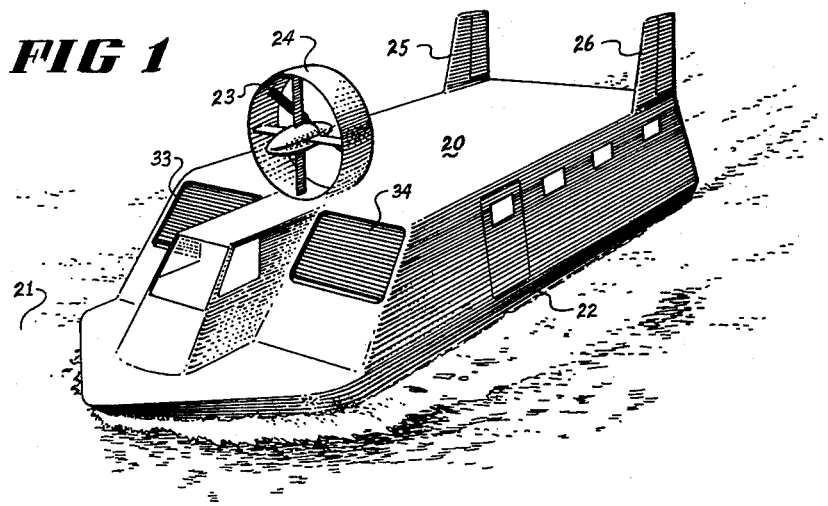

Referring now to the drawings in detail and describing the various parts, the aqua-track G.E.M. is shown in FIGURE 1 operating as a displacement vessel in the open sea 21. Flotation of the vehicle is maintained by the watertight hull 22. The air propeller 23, housed in the duct 24, provides a means of auxiliary propulsion to the aqua-track G.E.M. 20 in its displacement vessel role, while the rudders 25 and 26 provide auxiliary steering. Primary propulsion of the aqua-track G.E.M. 20 as a displacement vessel will be explained and illustrated later. The air intakes 33 and 34 shown in this view are the sources of air directed into a plenum chamber (not shown in this view) for a purpose to be described.

The side view of FIGURE 2 shows the aqua-track G.E.M. 20 still in its displacement vessel role, but propelled by the primary propulsion system mentioned previously. The track 27, located in the track housing 29 indicated in FIGURE 3 and more particularly illustrated in the cross section view of FIGURE 4, comprises a plurality of linked sections joining to form an endless belt. Sections of the track 27 are fitted with one or more blades (hereinafter described more fully) so that, in the displacement vessel role of the aqua-track G.E.M. 20, their movement beneath the surface of the water 21 provides propulsion in the manner of paddles. The track 27 is powered by the drive wheel 28 shown in FIGURE 2. Power from the engine 37 is transferred through the combination differential and transmission 38 of FIGURE 3 and through the shaft 39, to the drive wheel 28. The upper or forward-moving part of the track 27 is above the flotation level of the fully loaded aqua-track G.E.M. 20, and only the rearward motion of the track 27 is experienced by the water 21; consequently, there is a resultant forward motion of the aqua-track G.E.M. 20.

The fan 32 of FIGURE 3, whose purpose will be explained, is located in the space between the floor of the cargo compartment 36 and the underside of the aqua-track G.E.M. 20. Power from the engine 37 is transferred by the shaft 40 to the fan. Revolution of the fan 32 draws in air from the intakes 33 and 34 and pressurizes that air in the plenum chamber 35 shown in FIGURE 4.

Figure 4:
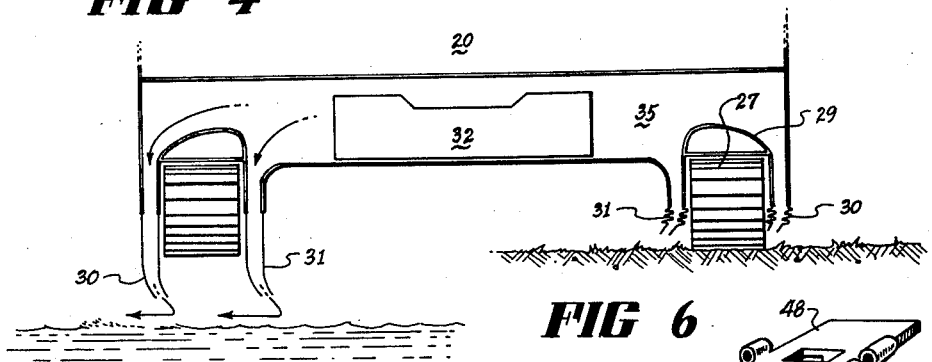

Air cushion support for the aqua-track G.E.M. 20 in its G.E.M. role is provided by emission of pressurized air from the nozzles 30 and 31 shown in FIGURE 3 and FIGURE 4. The nozzles 30 and 31 are linear; that is to say, they parallel the perimeter of the aqua-track G.E.M. 20 and depend therefrom much in the manner of skirts. Being separated from each other on either side of the aqua-track G.E.M. 20 by the track housing 29, and divided by an equal distance at the bow and stern, the linear nozzles 30 and 31 provide stability compartmentation of the air cushion. A further characteristic of the linear nozzles 30 and 31 is their elasticity. Because of this, they possess the ability to extend from the plenum chamber 35 when there is air pressure therein, to a distance that exceeds the extension of the track 27 beneath the track housing 29. Likewise, they possess the ability to return to their normal, or unextended position when there is no pressure in the plenum chamber 35. At the left of FIGURE 4 the nozzles 30 and 31 are shown in their extended position as they would be in the G.E.M. role of the aqua-track G.E.M. 20. At the right of FIGURE 4 the nozzles 30 and 31 are shown in the normal, or retracted position as they would be when there is no pressure present in the plenum chamber 35 and the aqua-track G.E.M. 20 is operating as a displacement vessel or as an overland, surface-supported vehicle.

Figure 5:
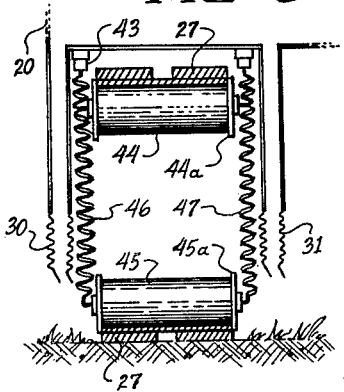

Tension is maintained on the track 27 by the suspension arrangement shown in FIGURE 5. A plurality of shock absorbers 43, mounted in the track housing 29, support the aqua-track G.E.M. 20 on the track 27. The rollers 44 and 45 bear against the track 27 by tension of the springs 46 and 47. The flanges 44a and 45a of the rollers 44 and 45 maintain the track 27 between them in the proper operating position.

Figure 6:
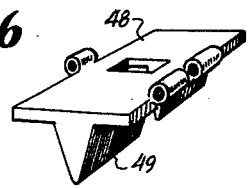
FIGURE 6 is a perspective view of a section of the track.
Figure 7:
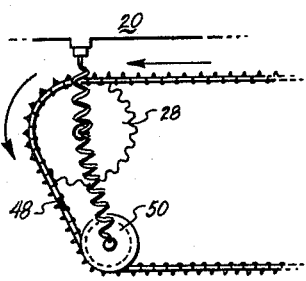
FIGURE 7 is a side view of the drive wheel and the idler wheel.

An individual section 48 of the track 27 is shown in FIGURE 6. The plurality of sections 48 comprising the track 27 are of flexible material capable of conforming to the curvatures dictated by the drive wheel 28 and the idler wheel 50 of FIGURE 7. Each section 48 includes one or more blades 49.

A description of the operation of the aqua-track G.E.M. in a typical landing operation follows.

The aqua-track G.E.M. is loaded with its cargo, excluding personnel, and driven or hoisted aboard a larger vessel of long range capacity, capable of negotiating high sea states. The rectangular configuration of the aqua-track G.E.M. makes for ease of close storage aboard the ocean-going vessel.

The ocean-going vessel conveys the aqua-track G.E.M. to an operationally practical distance from the shore where a landing is to be made and the vehicle is placed or driven into the water. Because of its displacement vessel capability, and because the same means of propulsion is used for solid-surface driving and displacement vessel operation, when it is driven into the water the aqua-track G.E.M. may, if it is so desired, continue its journey without alternation of its mode, the lower, rearward-moving part of the track continuing to provide forward propulsion. Braking of the aqua-track G.E.M. in its displacement vessel role is performed by reversing the direction of both tracks, while steering is accomplished by braking one of the tracks.

If operational circumstances demand a swift journey to shore, the aqua-track G.E.M., once clear of the transporting vessel may discontinue its displacement vessel role and proceed to shore as a G.E.M. This is accomplished by declutching the track drive wheel from the engine and engaging the fan and air propeller. (The air propeller may be driven by mechanical shafting or hydraulic coupling from the engine.) The plenum chamber of the vehicle is pressurized and the linear elastic nozzles respond by extending beyond the track. Pressurized air from the nozzles is directed downwards and inwards, providing an air cushion that raises the vehicle and supports it above the surface of the water. Forward propulsion in this mode is obtained from the air propeller which operates on the economical, ducted fan principle. Steering is obtained from deflection of the rudders.

The nature of the shoreline terrain will determine the mode of the vehicle's approach to land. If the beach is steeply sloped or congested with large obstacles, the aqua-track G.E.M. will revert to its track propulsion and greater maneuverability. A comparatively level beach, however, will permit the vehicle's approach as a G.E.M. Further inland, the mode of the aqua-track G.E.M. will be governed by operational requirements.

It is to be noted that only complete engine failure incapacitates the aqua-track G.E.M. in all its modes. For example, damage to or loss of the tracks will not adversely affect the vehicle's G.E.M. mode, nor will it prevent forward propulsion of the vehicle in its displacement vessel mode. Propulsion is still available to the vehicle from the air propeller whose duct provides it with a measure of protection from bullets or shrapnel. Similarly, failure of the fan or large punctures in the plenum chamber will not influence the tracked vehicle mode. The clutching arrangement of each system to the engine permits the isolation of any system from the power source and also their usage in any combination desired.

Having thus described my invention, what I claim as novel and desire to secure by Letters Patent of the United States is:

1. An amphibious G.E.M., comprising:
  a boat hull;
  extendible and retractable nozzle means positioned under the boat hull to enable the providing of an air cushion between the hull and a water or land surface underneath said hull;
  a power fan for selectively providing a flow of air to said nozzle means for discharge therefrom thereby extending said nozzle means; and
  traction means on said hull for propelling said G.E.M. as displacement vessel and as land vehicle whenever said nozzle means is retracted.

2. An amphibious G.E.M., comprising:
  a boat hull;
  a plenum chamber in said hull;
  a fan for selectively delivering air to said plenum chamber;
  extendible and retractable nozzle means communicating with said plenum chamber and positioned under the boat hull to selectively provide an air cushion between the hull and a water or land surface underneath said hull, said nozzle means being extended during discharge of air to provide said cushion, said nozzle means being retracted when no flow of air is provided to said plenum chamber; and
  means for propelling said G.E.M. as displacement vessel and land vehicle whenever said nozzle means is retracted.

3. An amphibious G.E.M., comprising:
  a boat hull;
  extendible and retractable nozzle means disposed under the boat hull to provide an air cushion between the hull and a water or land surface underneath said hull;
  a motive power source;
  a fan selectively connectable to said power source for delivering pressurized air to said nozzle means for discharge through said nozzle means and to extend said nozzle;
  traction means on said hull including a plurality of blades which when submerged under water propel said G.E.M. as displacement vessel and providing traction when driving over land, said nozzles when extended prevent ground contact of said traction means.

4. An amphibious G.E.M., comprising:
  a boat hull;
  a pair of tracks on said hull for propelling said G.E.M. as displacement vessel and land vehicle;
  extendible and retractable elastic nozzle means positioned under the boat hull adjacent said tracks to enable the providing of an air cushion between the hull and a water or land surface underneath said hull; and
  a motor driven fan for selectively providing a flow of air to said nozzle means thereby extending said nozzle means and providing said air cushion, said nozzle means extending at both sides of each of said tracks and preventing ground contact of said tracks.

5. An amphibious G.E.M., comprising:
  a boat hull;
  a pair of tracks on said hull for propelling said G.E.M. as displacement vessel and land vehicle;
  elastic linear nozzle means positioned under the boat hull to enable the providing of an air cushion between the hull and a water or land surface underneath said hull;
  motor means; and
  a fan connected to said motor means for selectively providing a flow of air to said nozzle means for discharge therefrom thereby extending said nozzle means and providing said air cushion sufficient to lift said hull with tracks from ground.

6. An amphibious G.E.M., comprising:
  a boat hull;
  retractable and extendible nozzle means mounted under the boat hull for providing an air cushion between the hull and a water or land surface;
  a motive power source;
  a fan selectively connectable to said power source for providing a flow of air to said nozzle means, thereby expanding said nozzle means and providing said air cushion;
  and a pair of tracks on said hull and selectively connectable to said power source, for propelling said G.E.M. in direct contact with ground or partially submerged in water, said nozzle means when extended preventing ground contact of said tracks.

7. G.E.M., comprising:
a hull;
a plenum chamber in said hull;
a fan for selectively delivering air to said plenum chamber;
extendible and retractable nozzle means communicating with said plenum chamber and positioned under the boat hull to selectively provide an air cushion between the hull and a land surface underneath said hull, said nozzle means being extended during discharge of air to provide said cushion, said nozzle means being retracted when no flow of air is provided to said plenum chamber; and
traction means for propelling said G.E.M. as land vehicle whenever said nozzle means is retracted, said nozzle means when extended preventing contact of said traction means and said land surface.

8. An amphibious G.E.M., comprising:
a boat hull;
a plenum chamber in said hull;
a fan for selectively delivering air to said plenum chamber;
extendible and retractable nozzle means communicating with said plenum chamber and positioned under the boat hull to selectively provide an air cushion between the hull and a water or land surface underneath said hull, said nozzle means being extended during discharge of air to provide said cushion, said nozzle means being retracted when no flow of air is provided to said plenum chamber; and
means for propelling said G.E.M. as displacement vessel whenever said nozzle means is retracted.

9. An amphibious G.E.M. comprising: a boat hull;
a plenum chamber in said hull;
a fan for selectively delivering air to said plenum chamber;
extendable and retractable nozzle means communicating with said plenum chamber and positioned underneath said boat hull to selectively provide an air cushion between the hull and the water or land surface underneath said hull, said nozzle means being extended during discharge of air to provide said cushion, said nozzle means being retracted when no flow of air is provided to said plenum chamber; means for propelling said G.E.M. in displacement vessel whenever said nozzle means is retracted; and
an air propeller for propelling said G.E.M. when said nozzle means are extended.

References Cited by the Examiner

UNITED STATES PATENTS

| | | | |
|---|---|---|---|
| 2,894,476 | 7/59 | Lindgren | 115—1 |
| 3,029,042 | 4/62 | Martin | 180—7 |
| 3,054,467 | 9/62 | Seiler | 115—1 |
| 3,095,938 | 7/63 | Bertelsen | 180—7 |
| 3,114,347 | 12/63 | Trippel | 115—1 |

FOREIGN PATENTS 860,781 2/61 Great Britain.
1,238,499 7/60 France.

MILTON BUCHLER, *Primary Examiner.*